US012812436B2

(12) United States Patent
Bin Redhwan et al.

(10) Patent No.: US 12,812,436 B2
(45) Date of Patent: Nov. 24, 2026

(54) SIGNALING BASED MINIMIZATION OF DRIVE TEST CONFIGURATION AVAILABILITY

(71) Applicant: Telefonaktiebolaget LM Ericsson (publ), Stockholm (SE)

(72) Inventors: Sakib Bin Redhwan, Linköping (SE); Marco Belleschi, Solna (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 339 days.

(21) Appl. No.: 18/578,553

(22) PCT Filed: Jun. 27, 2022

(86) PCT No.: PCT/EP2022/067606

§ 371 (c)(1),
(2) Date: Jan. 11, 2024

(87) PCT Pub. No.: WO2023/011804

PCT Pub. Date: Feb. 9, 2023

(65) Prior Publication Data

US 2024/0298203 A1 Sep. 5, 2024

Related U.S. Application Data

(60) Provisional application No. 63/229,941, filed on Aug. 5, 2021.

(51) Int. Cl.
*H04W 24/10* (2009.01)
*H04W 48/16* (2009.01)

(52) U.S. Cl.
CPC .......... *H04W 24/10* (2013.01); *H04W 48/16* (2013.01)

(58) Field of Classification Search
CPC .............................. H04W 24/10; H04W 48/16
(Continued)

(56) References Cited

U.S. PATENT DOCUMENTS 11,895,524 B2 * 2/2024 Tomala ................. H04W 24/10
11,950,120 B2 * 4/2024 Han ...................... H04W 24/10
(Continued)

FOREIGN PATENT DOCUMENTS

EP 3086595 A1 * 10/2016 ............ H04W 24/10
WO WO-2013048218 A1 * 4/2013 ............ H04W 76/15
WO WO-2021099945 A2 * 5/2021 ............ H04W 48/20

OTHER PUBLICATIONS

International Search Report and Written Opinion of the International Searching Authority, PCT/EP2022/067606, mailed Sep. 30, 2022, 19 pages.

(Continued)

*Primary Examiner* — Mahendra R Patel
(74) *Attorney, Agent, or Firm* — Sage Patent Group

(57) ABSTRACT

A method performed by a communication device for communicating with a wireless network is provided. The method includes receiving a signalling based logged MDT configuration from a first network node belonging to a first RAT. The signalling based logged MDT configuration includes a first PLMN identity list. The method further includes signalling, towards a second network node belonging to a second RAT and a second PLMN, an indication including a signalling based MDT configuration availability in the communication device irrespective of whether the second PLMN belongs to the first PLMN identity list and/or the second RAT matches the first RAT. A method performed by a network node; and related devices and methods are also disclosed.

18 Claims, 9 Drawing Sheets

(58) Field of Classification Search
USPC .......................................................... 455/434
See application file for complete search history.

(56) References Cited

U.S. PATENT DOCUMENTS

| | | | | |
|---|---|---|---|---|
| 12,096,245 | B2 * | 9/2024 | Chang | H04W 24/02 |
| 2011/0201279 | A1 * | 8/2011 | Suzuki et al. | H04W 24/10 455/67.11 |
| 2011/0250880 | A1 * | 10/2011 | Olsson et al. | H04W 76/18 455/423 |
| 2014/0128057 | A1 * | 5/2014 | Siomina | H04W 56/00 455/423 |
| 2014/0295847 | A1 * | 10/2014 | Futaki | H04W 36/0058 455/436 |
| 2015/0044973 | A1 * | 2/2015 | Siomina | H04W 24/10 455/67.11 |
| 2017/0188256 | A1 * | 6/2017 | Wang | H04W 24/10 |
| 2021/0235300 | A1 * | 7/2021 | Teyeb | H04W 24/10 |
| 2022/0167196 | A1 * | 5/2022 | Arshad | H04W 24/10 |
| 2022/0182850 | A1 * | 6/2022 | Ramachandra et al. | H04W 24/02 |
| 2023/0045440 | A1 * | 2/2023 | Sharma | H04W 24/10 |
| 2023/0199541 | A1 * | 6/2023 | Wang | H04W 24/10 455/422.1 |

OTHER PUBLICATIONS

Huawei et al., "Minor issues on MDT," 3GPP TSG-RAN WG2 Meeting #109bis-e, R2-2003574, Electronic, Apr. 20-30, 2020, 4 pages.

ZTE, "Management based MDT should not overwrite signalling based MDT," 3GPP TSG-RAN WG3 #108-e, R3-203887, Jun. 1-11, 2020, Online, 14 pages.

3GPP TS 37.320 V16.5.0 (Jun. 2021); 3rd Generation Partnership Project; Technical Specification Group Radio Access Network; Universal Terrestrial Radio Access (UTRA), Evolved Universal Terrestrial Radio Access (E-UTRA) and Netxt Generation Radio Access; Radio measurement collection for Minimization of Drive Tests (MDT); Overall description; Stage 2 (Release 16), 35 pages.

Ericsson, "On logged MDT related enhancements," 3GPP TSG-RAN WG2 Meeting #115-e, R2-2108306, Online meeting, Aug. 9-27, 2021, 12 pages.

3GPP TS 38.331 V16.5.0 (Jun. 2021); 3rd Generation Partnership Project; Technical Specification Group Radio Access Network; NR; Radio Resource Control (RRC) protocol specification (Release 16), 959 pages.

* cited by examiner

SIGNALING BASED MINIMIZATION OF DRIVE TEST CONFIGURATION AVAILABILITY

CROSS REFERENCE TO RELATED APPLICATIONS

This application is a 35 U.S.C. § 371 national stage application of PCT International Application No. PCT/EP2022/067606 filed on Jun. 27, 2022, which in turn claims domestic priority to U.S. Provisional Patent Application No. 63/229,941, filed on Aug. 5, 2021, the disclosures and content of which are incorporated by reference herein in their entirety.

TECHNICAL FIELD

The present disclosure relates generally to communications, and more particularly to communication methods and related devices and nodes supporting communicating with a wireless network.

BACKGROUND

Minimization of drive test, MDT, was standardized for new radio (NR) in Rel-16 to reduce the amount of drive tests performed manually. MDT refers to a communication device (also referred to herein as a "user equipment", "UE", and/or "wireless terminal") assisted framework where network measurements are collected by both IDLE/INACTIVE and RRC Connected UE(s) in order to aid the network in gathering valuable information. It has been specified for both long term evolution (LTE) and NR in third generation partnership program (3GPP) TS 37.320, V16.5.0.

MDT types based on radio resource control (RRC) states generally include two types of MDT measurement logging, i.e., Logged MDT and Immediate MDT.

For logged MDT, a UE in an RRC_IDLE/RRC_INACTIVE state is configured to perform periodical and event triggered MDT logging after receiving the MDT configuration from the network. The UE shall report the downlink (DL) pilot strength measurements (reference signal received power (RSRP)/reference signal received quality (RSRQ)) together with time information, detailed location information if available, and WLAN, Bluetooth to the network via use of the UE information framework when it is in RRC_CONNECTED state. The DL pilot strength measurement of Logged MDT is collected based on the existing measurements required for cell reselection purpose, without imposing on the UE to perform additional measurements.

The following table from 3GPP TS 37.320, V16.5.0 illustrates measurement logging for Logged MDT:

| MDT mode | RRC states | Measurement quantities |
|---|---|---|
| Logged MDT | RRC_IDLE/RRC_INACTIVE | RSRP and RSRQ of the serving cell and available UE measurements for intra-frequency/inter-frequency/inter-RAT, time stamp and detailed location information if available. |

For Periodical Logged MDT, a UE receives the MDT configurations including logginginterval and loggingduration in the RRC message, i.e., LoggedMeasurementConfiguration, from the network. A timer (e.g., T330) is started at the UE upon receiving the configurations and set to loggingduration (10 min-120 min). The UE shall perform periodical MDT logging with the interval set to logginginterval (e.g., 1.28 s-61.44 s) when the UE is in RRC_IDLE. An example of a logged MDT procedure is shown in FIG. 1.

For event triggered Logged MDT, a UE receives an eventType and logginginterval from the network. The UE logs the measurement reports at every logginginterval if event configured in eventType is satisfied.

SUMMARY

In various embodiments of the present disclosure, a method performed by a communication device for communicating with a wireless network is provided. The method includes receiving a signalling based logged minimization of drive test, MDT, configuration from a first network node belonging to a first radio access technology, RAT. The signalling based logged MDT configuration includes a first public land mobile network, PLMN, identity list. The method further includes signalling, towards a second network node belonging to a second RAT and a second PLMN, an indication including a signalling based MDT configuration availability in the communication device irrespective of whether the second PLMN belongs to the first PLMN identity list and/or the second RAT matches the first RAT.

In other embodiments, a method performed by a network node communicatively connected to a communication device for communicating with a wireless network is provided. The method includes receiving, from the communication device, an indication including a signalling based MDT configuration availability in the communication device. The indication is reported by the communication device irrespective of whether a second PLMN belongs to a first PLMN identity list and/or a current RAT matches a first RAT.

In other embodiments, a communication device for communicating with a wireless network is provided. The communication device is adapted to perform operations including receive a signalling based logged MDT configuration from a first network node belonging to a first RAT. The signalling based logged MDT configuration includes a first PLMN identity list. The operations further include signal, towards a second network node belonging to a second RAT and a second PLMN, an indication including a signalling based MDT configuration availability in the communication device irrespective of whether the second PLMN belongs to the first PLMN identity list and/or the second RAT matches the first RAT.

In other embodiments, a communication device for communicating with a wireless network is provided. The communication device includes at least one processor, and at least one memory connected to the at least one processor and storing program code that is executed by the at least one processor to perform operations. The operations include receive a signalling based logged MDT configuration from a first network node belonging to a first RAT. The signalling based logged MDT configuration includes a first PLMN identity list. The operations further include signal, towards a second network node belonging to a second RAT and a second PLMN, an indication including a signalling based MDT configuration availability in the communication device irrespective of whether the second PLMN belongs to the first PLMN identity list and/or the second RAT matches the first RAT.

In other embodiments, a computer program including program code to be executed by processing circuitry of a communication device for communicating with a wireless network is provided. Execution of the program code causes the communication device to perform operations including receive a signalling based logged MDT configuration from a first network node belonging to a first RAT. The signalling based logged MDT configuration includes a first PLMN identity list. The operations further include signal, towards a second network node belonging to a second RAT and a second PLMN, an indication including a signalling based MDT configuration availability in the communication device irrespective of whether the second PLMN belongs to the first PLMN identity list and/or the second RAT matches the first RAT.

In other embodiments, a computer program product including a non-transitory storage medium including program code to be executed by processing circuitry of a communication device for communicating with a wireless network is provided. Execution of the program code causes the communication device to perform operations including receive a signalling based logged MDT configuration from a first network node belonging to a first RAT. The signalling based logged MDT configuration includes a first PLMN identity list. The operations further include signal, towards a second network node belonging to a second RAT and a second PLMN, an indication including a signalling based MDT configuration availability in the communication device irrespective of whether the second PLMN belongs to the first PLMN identity list and/or the second RAT matches the first RAT.

In other embodiments, a network node communicatively connected to a communication device for communicating with a wireless network is provided. The network node is adapted to perform operations including receive, from the communication device, an indication comprising a signalling based MDT configuration availability in the communication device. The indication is reported by the communication device irrespective of whether a second PLMN belongs to a first PLMN identity list and/or a current RAT matches a first RAT.

In other embodiments, a network node communicatively connected to a communication device for communicating with a wireless network is provided. The network node includes at least one processor, and at least one memory connected to the at least one processor and storing program code that is executed by the at least one processor to perform operations. The operations include receive, from the communication device, an indication comprising a signalling based MDT configuration availability in the communication device. The indication is reported by the communication device irrespective of whether a second PLMN belongs to a first PLMN identity list and/or a current RAT matches a first RAT.

In other embodiments, a computer program including program code to be executed by processing circuitry of a network node for communicating with a wireless network is provided. Execution of the program code causes the network node to perform operations. The operations include receive, from the communication device, an indication comprising a signalling based MDT configuration availability in the communication device. The indication is reported by the communication device irrespective of whether a second PLMN belongs to a first PLMN identity list and/or a current RAT matches a first RAT.

In other embodiments, a computer program product including a non-transitory storage medium including program code to be executed by processing circuitry of a network node communicating with a wireless network is provided. Execution of the program code causes the network node to perform operations including receive, from the communication device, an indication comprising a signalling based MDT configuration availability in the communication device. The indication is reported by the communication device irrespective of whether a second PLMN belongs to a first PLMN identity list and/or a current RAT matches a first RAT.

Certain aspects of the disclosure and their embodiments may provide solutions to challenges. Various embodiments include a method performed by a communication device including signalling, towards a second network node belonging to a second RAT and a second PLMN an indication including a signalling based MDT configuration availability in the communication device irrespective of whether the second PLMN belongs to a first PLMN identity list and/or the second RAT matches a first RAT.

Certain embodiments may provide one or more of the following technical advantage(s). Based on signalling from the communication device, the network may gather updated information about the on-going signalling based logged MDT status in the communication device irrespective of the configuring RAT and PLMN and, thus, may avoid overwriting it with management-based MDT configuration.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
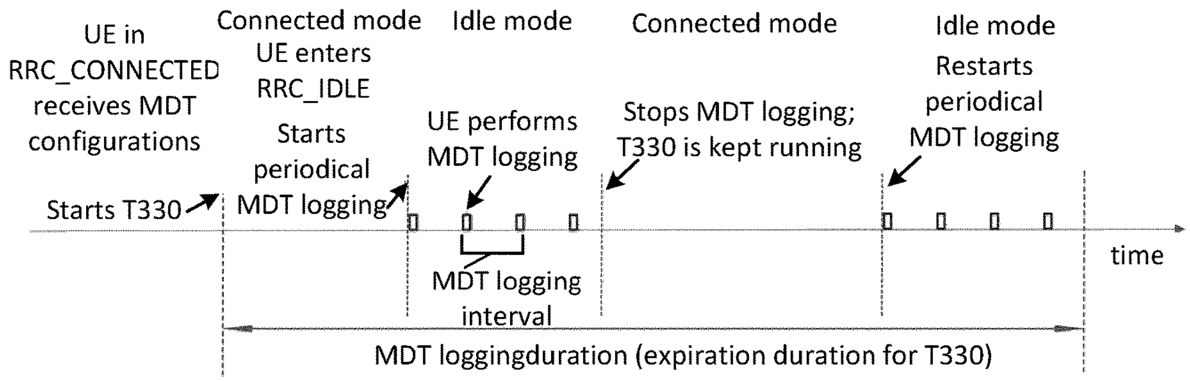
FIG. 1 is example of a logged MDT procedure.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Additional information may also be found in the document provided in the Appendix.

Current progress in 3GPP includes that, in 3GPP it was identified that if a UE is configured with signalling based logged MDT configuration, then the UE should not be chosen for management based logged MDT configuration while the former configuration in still active. There was agreement on a UE assisted network-based solution. In summary, the agreed solution includes that a UE should provide assistance information containing an indication that it has an active signalling based MDT configuration and the network will refrain to configure the UE with management-based MDT configuration.

There currently exist certain challenges. An assumption of the MDT framework is that a UE only reports MDT related information to the configuring PLMN and RAT. Thus, the UE does not inform the network regarding configuration and logged reports unless both the current PLMN and RAT matches with the PLMN and RAT that configured the UE. As a consequence, a challenge exists in avoiding signalling based logged MDT from being overwritten. For example, in a scenario where a UE has an ongoing signalling based logged MDT configuration (e.g., a T330 timer is running and the UE returns to RRC connected state at a different PLMN or a different RAT in the same PLMN), the UE will not inform the network regarding the signalling based logged MDT configuration and the network may overwrite it with a management based logged MDT configuration and break the agreement.

Various embodiments of the present disclosure include that a communication device signals to the network a signalling based MDT configuration availability in the communication device irrespective of whether a second PLMN belongs to a first PLMN identity list and/or a second RAT matches a first RAT.

Certain embodiments may provide one or more of the following technical advantages. By including such signalling to the network from the communication device, the network may gather updated information about the on-going signalling based logged MDT status in the communication device irrespective of the configuring RAT and/or PLMN and, thus, the communication may aid the network to avoid overwriting a preconfigured signalling based MDT configuration in the communication device with a management based MDT configuration.

Operations of the method of various embodiments will now be discussed further with respect to an example embodiment. While the example embodiment is explained in the non-limiting context of the following sequence of operations, the operations noted may occur out of the order noted. For example, two operations may be described in succession but may in fact be executed substantially concurrently or the operations may sometimes be executed in the reverse order, depending upon the operations involved. Moreover, the operations may be separated into multiple operations and/or the operations of two or more operations may be at least partially integrated. Finally, other operations may be added/inserted between the operations blocks that are described, and/or operations may be omitted without departing from the scope of inventive concepts.

In an example embodiment, a communication device receives a signalling based logged MDT configuration from the network, e.g. from a network node for a certain PLMN, when being connected to a certain RAT and stores it. In some embodiments, the configuration contains a validity timer, (e.g., T330) of the configuration as standardized in [1]. For ease of discussion, and without limitation, this operation is referred to herein as a “first operation”.

In some embodiments, the communication device transitions to a dormant state (e.g., RRC IDLE/INACTIVE). In some embodiments, the communication device evaluates logged MDT collection criterion.

In some embodiments, the communication device transitions to a connected state (e.g., RRC_Connected state by following standardized methods in 3GPP TS 38.331, V16.5.0). The communication device may or may not have a stored logged MDT report at this point. Additionally, the timer (e.g., a T330 timer) associated with the configuration may or may not have been expired.

In some embodiments, upon or after transitioning to the connected state (e.g., RRC Connected state), the communication device sends an indication towards the network regarding ongoing signalling based MDT configuration availability of the communication device.

In some embodiments, the communication device reports the signalling based MDT configuration availability of the communication device to network if the configuring PLMN and current PLMN are same, irrespective of whether the RAT in which the communication device is currently connected is the same as the RAT that configured the communication device with the MDT configuration in the first operation.

In another embodiment, the communication device reports the signalling based MDT configuration availability of the communication device to the network if the configuring RAT and current RAT are same, irrespective of whether the PLMN to which the communication device is currently connected is the same as the PLMN that configured the communication device with the MDT configuration in the first operation.

In another embodiment, the communication device reports the signalling based MDT configuration availability of the communication device to the network ignoring configuring PLMN, RAT and current PLMN, RAT information, respectively. In some embodiments, the communication device reports an indication of the PLMN (and/or of the RAT) that configured the communication device in the first operation. In some embodiments, responsive to receiving the indication, the network decides whether to fetch the MDT-related information report, e.g. based on the PLMN that configured it, or not. In some embodiments, when receiving the MDT-related information report whose configuration was provided by a different PLMN, the PLMN passes it to the configuring PLMN.

In some embodiments, the communication device reports the indication to the network until a defined period of time after expiration of a timer included in the signalling based logged MDT received from the network (e.g., n time units have passed after the timer expiry (e.g., T330 timer expiry)). In an example embodiment, n has a value of 48 hours. Thus, if the configured timer value is set to 120 minutes, the communication device reports the indication to network until 3000 minutes past since receiving the configuration.

An example embodiment of implementation of the method of the present disclosure for NR in 3GPP TS 38.331, V16.5.0, section 6.1.1.1, 5.3.3.4 (entitled "Reception of the RRCSetup by the UE") is now provided:

The UE shall perform the following actions upon reception of the RRCSetup:

1> if the RRCSetup is received in response to an RRCReestablishmentRequest; or

1> if the RRCSetup is received in response to an RRCResumeRequest or RRCResumeRequest1:

2> discard any stored UE Inactive AS context and suspendConfig;

2> discard any current AS security context including the $K_{RRCenc}$ key, the $K_{RRCint}$ key, the $K_{UPint}$ key and the $KU_{Penc}$ key;

2> release radio resources for all established RBs except SRB0, including release of the RLC entities, of the associated PDCP entities and of SDAP;

2> release the RRC configuration except for the default L1 parameter values, default MAC Cell Group configuration and CCCH configuration;

2> indicate to upper layers fallback of the RRC connection;

2> stop timer T380, if running;

1> perform the cell group configuration procedure in accordance with the received masterCellGroup and as specified in 5.3.5.5;

1> perform the radio bearer configuration procedure in accordance with the received radioBearerConfig and as specified in 5.3.5.6;

1> if stored, discard the cell reselection priority information provided by the cellReselectionPriorities or inherited from another RAT;

1> stop timer T300, T301 or T319 if running;

1> if T390 is running:

2> stop timer T390 for all access categories;

2> perform the actions as specified in 5.3.14.4;

1> if T302 is running:

2> stop timer T302;

2> perform the actions as specified in 5.3.14.4;

1> stop timer T320, if running;

1> if the RRCSetup is received in response to an RRCResumeRequest, RRCResumeRequest1 or RRCSetupRequest:

2> if T331 is running:

3> stop timer T331;

3> perform the actions as specified in 5.7.8.3;

2> enter RRC_CONNECTED;

2> stop the cell re-selection procedure;

1> consider the current cell to be the PCell;

1> if the UE has radio link failure or handover failure information available in VarRLF-Report and if the RPLMN is included in plmn-IdentityList stored in VarRLF-Report:

2> if reconnectCellId in VarRLF-Report is not set, and if the received RRCSetup is in response to an RRCSetupRequest:

3> set timeUntilReconnection in VarRLF-Report to the time that elapsed since the last radio link failure or handover failure;

3> set nrReconnectCellId in reconnectCellId in VarRLF-Report to the global cell identity and the tracking area code of the PCell;

1> if the UE supports RLF report for inter-RAT MRO NR as defined in TS 36.306 [62], and if the UE has radio link failure or handover failure information available in VarRLF-Report of TS 36.331 and if the RPLMN is included in plmn-IdentityList stored in VarRLF-Report of TS 36.331 [10]:

2> if reconnectCellId in VarRLF-Report of TS 36.331[10] is not set:

3> set timeUntilReconnection in VarRLF-Report of TS 36.331[10] to the time that elapsed since the last radio link failure or handover failure in LTE;

3> set nrReconnectCellId in reconnectCellId in VarRLF-Report of TS 36.331[10] to the global cell identity and the tracking area code of the PCell;

1> set the content of RRCSetupComplete message as follows:

2> if upper layers provide a 5G-S-TMSI:

3> if the RRCSetup is received in response to an RRCSetupRequest:

4> set the ng-5G-S-TMSI-Value to ng-5G-S-TMSI-Part2;

3> else:

4> set the ng-5G-S-TMSI-Value to ng-5G-S-TMSI;

2> if upper layers selected an SNPN or a PLMN and in case of PLMN UE is either allowed or instructed to access the PLMN via a cell for which at least one CAG ID is broadcast:

3> set the selectedPLMN-Identity from the npn-IdentityInfoList;

2> else:

3> set the selectedPLMN-Identity to the PLMN selected by upper layers from the plmn-IdentityList;

2> if upper layers provide the 'Registered AMF':

3> include and set the registeredAMF as follows:

4> if the PLMN identity of the 'Registered AMF' is different from the PLMN selected by the upper layers:

5> include the plmnidentity in the registeredAMF and set it to the value of the PLMN identity in the 'Registered AMF' received from upper layers;

4> set the amf-Identifier to the value received from upper layers;

3> include and set the guami-Type to the value provided by the upper layers;

2> if upper layers provide one or more S-NSSAI (see TS 23.003 [21]):

3> include the s-NSSAI-List and set the content to the values provided by the upper layers;

2> set the dedicatedNAS-Message to include the information received from upper layers;

2> if connecting as an IAB-node:

3> include the iab-NodeIndication;

2> if the SIB1 contains idleModeMeasurementsNR and the UE has NR idle/inactive measurement information concerning cells other than the PCell available in VarMeasIdleReport; or 2> if the SIB1 contains idleModeMeasurementsEUTRA and the UE has E-UTRA idle/inactive measurement information available in VarMeasidleReport:

3> include the idleMeasAvailable;

2> if the UE has signalling based logged MDT configuration or logged measurements available for other RAT and if the RPLMN is not included in plmn-IdentityList stored in VarLogMeasReport:

3> include the signallingLogConfigAvailable in the RRCSetupComplete message;

2> if the UE has logged measurements available for NR and if the RPLMN is included in plmn-IdentityList stored in VarLogMeasReport:

3> include the logMeasAvailable in the RRCSetupComplete message;

3> if Bluetooth measurement results are included in the logged measurements the UE has available for NR:

4> include the logMeasAvailableBT in the RRCSetupComplete message;

3> if WLAN measurement results are included in the logged measurements the UE has available for NR:

4> include the logMeasAvailableWLAN in the RRCSetupComplete message;

2> if the UE has connection establishment failure or connection resume failure information available in VarConnEstFailReport and if the RPLMN is equal to plmn-Identity stored in VarConnEstFailReport:

3> include connEstFailInfoAvailable in the RRCSetupComplete message;

2> if the UE has radio link failure or handover failure information available in VarRLF-Report and if the RPLMN is included in plmn-IdentityList stored in VarRLF-Report, or 2> if the UE has radio link failure or handover failure information available in VarRLF-Report of TS 36.331 [10], and if the UE is capable of cross-RAT RLF reporting and if the RPLMN is included in plmn-IdentityList stored in VarRLF-Report of TS 36.331 [10]:

3> include rif-InfoAvailable in the RRCSetupComplete message;

2> if the UE supports storage of mobility history information and the UE has mobility history information available in VarMobilityHistoryReport:

3> include the mobilityHistoryAvail in the RRCSetupComplete message;

2> if the RRCSetup is received in response to an RRCResumeRequest, RRCResumeRequest1 or RRCSetupRequest:

3> if speedStateReselectionPars is configured in the SIB2:

4> include the mobilityState in the RRCSetupComplete message and set it to the mobility state (as specified in TS 38.304 [20]) of the UE just prior to entering RRC_CONNECTED state;

1> submit the RRCSetupComplete message to lower layers for transmission, upon which the procedure ends.

Figure 2:
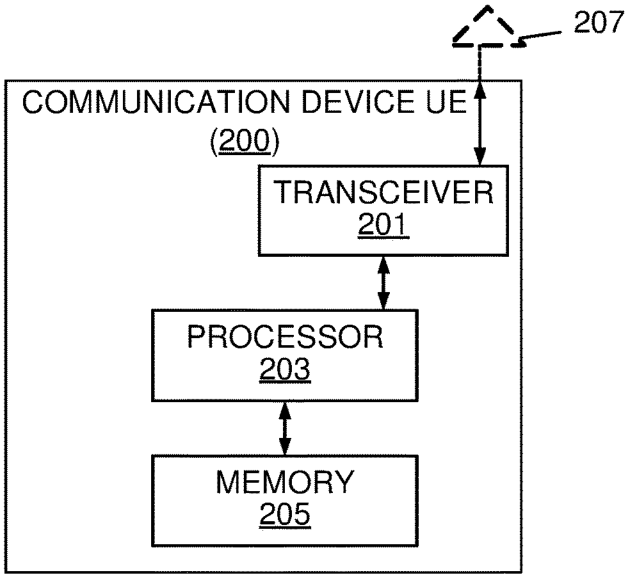
FIG. 2 is a block diagram illustrating a communication device UE according to some embodiments of inventive concepts.

FIG. 2 is a block diagram illustrating elements of a communication device UE 200 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 200 may be provided, for example, as discussed below with respect to wireless devices UE QQ112A, UE QQ112B, and wired or wireless devices UE QQ112C, UE QQ112D of FIG. 9, UE QQ200 of FIG. 10, virtualization hardware QQ504 and virtual machines QQ508A, QQ508B of FIG. 13, and UE QQ606 of FIG. 14, all of which should be considered interchangeable in the examples and embodiments described herein and be within the intended scope of this disclosure, unless otherwise noted.) As shown, communication device UE may include an antenna 207 (e.g., corresponding to antenna QQ222 of FIG. 10), and transceiver circuitry 201 (also referred to as a transceiver, e.g., corresponding to interface QQ212 of FIG. 10 having transmitter QQ218 and receiver QQ220) including a transmitter and a receiver configured to provide uplink and downlink radio communications with a base station(s) (e.g., corresponding to network node QQ110A, QQ110B of FIG. 9, network node QQ300 of FIG. 11, and network node QQ604 of FIG. 14 also referred to as a RAN node) of a radio access network. Communication device UE may also include processing circuitry 203 (also referred to as a processor, e.g., corresponding to processing circuitry QQ202 of FIG. 10, and control system QQ512 of FIG. 13) coupled to the transceiver circuitry, and memory circuitry 205 (also referred to as memory, e.g., corresponding to memory QQ210 of FIG. 9) coupled to the processing circuitry. The memory circuitry 205 may include computer readable program code that when executed by the processing circuitry 203 causes the processing circuitry to perform operations according to embodiments disclosed herein. According to other embodiments, processing circuitry 203 may be defined to include memory so that separate memory circuitry is not required. Communication device UE may also include an interface (such as a user interface) coupled with processing circuitry 203, and/or communication device UE may be incorporated in a vehicle.

As discussed herein, operations of communication device UE may be performed by processing circuitry 203 and/or transceiver circuitry 201. For example, processing circuitry 203 may control transceiver circuitry 201 to transmit communications through transceiver circuitry 601 over a radio interface to a radio access network node (also referred to as a base station) and/or to receive communications through transceiver circuitry 201 from a RAN node over a radio interface. Moreover, modules may be stored in memory circuitry 205, and these modules may provide instructions so that when instructions of a module are executed by processing circuitry 203, processing circuitry 203 performs respective operations (e.g., operations discussed below with respect to example embodiments relating to wireless communication devices). According to some embodiments, a communication device UE 200 and/or an element(s)/function(s) thereof may be embodied as a virtual node/nodes and/or a virtual machine/machines.

Figure 3:
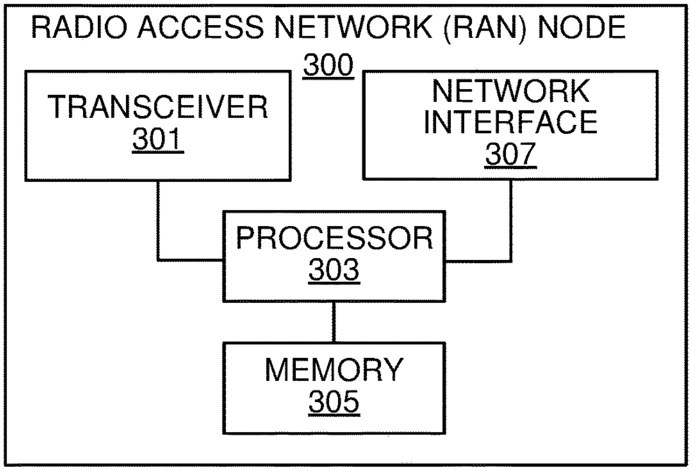
FIG. 3 is a block diagram illustrating a radio access network (RAN) node (e.g., a network node, a base station eNB/gNB) according to some embodiments of inventive concepts.

FIG. 3 is a block diagram illustrating elements of a radio access network RAN node 300 (also referred to as a network node, base station, eNodeB/eNB, gNodeB/gNB, etc.) of a RAN configured to provide cellular communication according to embodiments of inventive concepts. (RAN node 300 may be provided, for example, as discussed below with respect to network node QQ110A, QQ110B of FIG. 9, network node QQ300 of FIG. 11, hardware QQ504 or virtual machine QQ508A, QQ508B of FIG. 13, and/or base station QQ604 of FIG. 14, all of which should be considered interchangeable in the examples and embodiments described herein and be within the intended scope of this disclosure, unless otherwise noted.) As shown, the RAN node may include transceiver circuitry 301 (also referred to as a transceiver, e.g., corresponding to portions of RF transceiver circuitry QQ312 and radio front end circuitry QQ318 of FIG. 11) including a transmitter and a receiver configured to provide uplink and downlink radio communications with mobile terminals. The RAN node may include network interface circuitry 307 (also referred to as a network interface, e.g., corresponding to portions of communication interface QQ306 of FIG. 11) configured to provide communications with other nodes (e.g., with other base stations) of the RAN and/or core network CN. The network node may also include processing circuitry 303 (also referred to as a processor, e.g., corresponding to processing circuitry QQ302 of FIG. 11) coupled to the transceiver circuitry, and memory circuitry 305 (also referred to as memory, e.g., corresponding to memory QQ304 of FIG. 11) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that a separate memory circuitry is not required.

As discussed herein, operations of the RAN node may be performed by processing circuitry 303, network interface 307, and/or transceiver 301. For example, processing circuitry 303 may control transceiver 301 to transmit downlink communications through transceiver 301 over a radio interface to one or more mobile terminals UEs and/or to receive uplink communications through transceiver 301 from one or more mobile terminals UEs over a radio interface. Similarly, processing circuitry 303 may control network interface 307 to transmit communications through network interface 307 to one or more other network nodes and/or to receive communications through network interface from one or more other network nodes. Moreover, modules may be stored in memory 305, and these modules may provide instructions so that when instructions of a module are executed by processing circuitry 303, processing circuitry 303 performs respective operations (e.g., operations discussed below with respect to example embodiments relating to RAN nodes). According to some embodiments, RAN node e00 and/or an element(s)/function(s) thereof may be embodied as a virtual node/nodes and/or a virtual machine/machines.

As used herein, the terms "first network node" and "second network node" are used in a non-limiting manner and can refer to the same network node or to different network nodes.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 4:
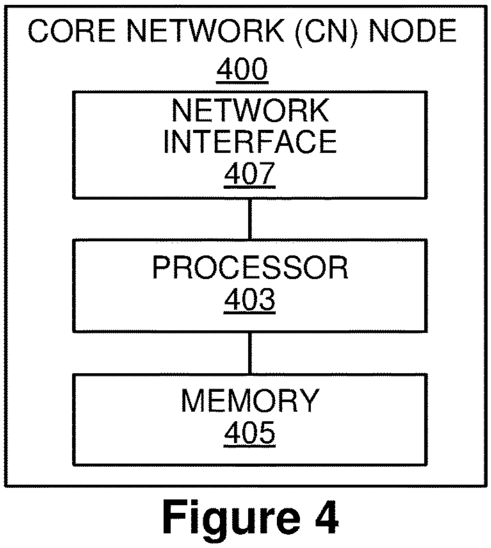
FIG. 4 is a block diagram illustrating a core network CN node (e.g., an AMF node, an SMF node, etc.) according to some embodiments of inventive concepts.

FIG. 4 is a block diagram illustrating elements of a core network (CN) node (e.g., an SMF (session management function) node, an AMF (access and mobility management function) node, etc.) of a communication network configured to provide cellular communication according to embodiments of inventive concepts. (CN node 400 may be provided, for example, as discussed below with respect to core network node QQ108 of FIG. 9, hardware QQ504 or virtual machine QQ508A, QQ508B of FIG. 13, all of which should be considered interchangeable in the examples and embodiments described herein and be within the intended scope of this disclosure, unless otherwise noted). As shown, the CN node may include network interface circuitry 407 configured to provide communications with other nodes of the core network and/or the radio access network RAN. The CN node may also include a processing circuitry 403 (also referred to as a processor,) coupled to the network interface circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the CN node may be performed by processing circuitry 403 and/or network interface circuitry 407. For example, processing circuitry 403 may control network interface circuitry 407 to transmit communications through network interface circuitry 407 to one or more other network nodes and/or to receive communications through network interface circuitry from one or more other network nodes. Moreover, modules may be stored in memory 405, and these modules may provide instructions so that when instructions of a module are executed by processing circuitry 403, processing circuitry 403 performs respective operations. According to some embodiments, CN node 400 and/or an element(s)/function(s) thereof may be embodied as a virtual node/nodes and/or a virtual machine/machines.

In the description that follows, while the communication device may be any of the communication device 200, wireless device QQ112A, QQ112B, wired or wireless devices UE QQ112C, UE QQ112D, UE QQ200, virtualization hardware QQ504, virtual machines QQ508A, QQ508B, or UE QQ606, the communication device 200 shall be used to describe the functionality of the operations of the communication device. Operations of the communication device 200 (implemented using the structure of the block diagram of FIG. 2) will now be discussed with reference to the flow charts of FIGS. 5 and 6 according to some embodiments of inventive concepts. For example, modules may be stored in memory 205 of FIG. 2, and these modules may provide instructions so that when the instructions of a module are executed by respective communication device processing circuitry 203, processing circuitry 203 performs respective operations of the flow charts.

Figure 5:
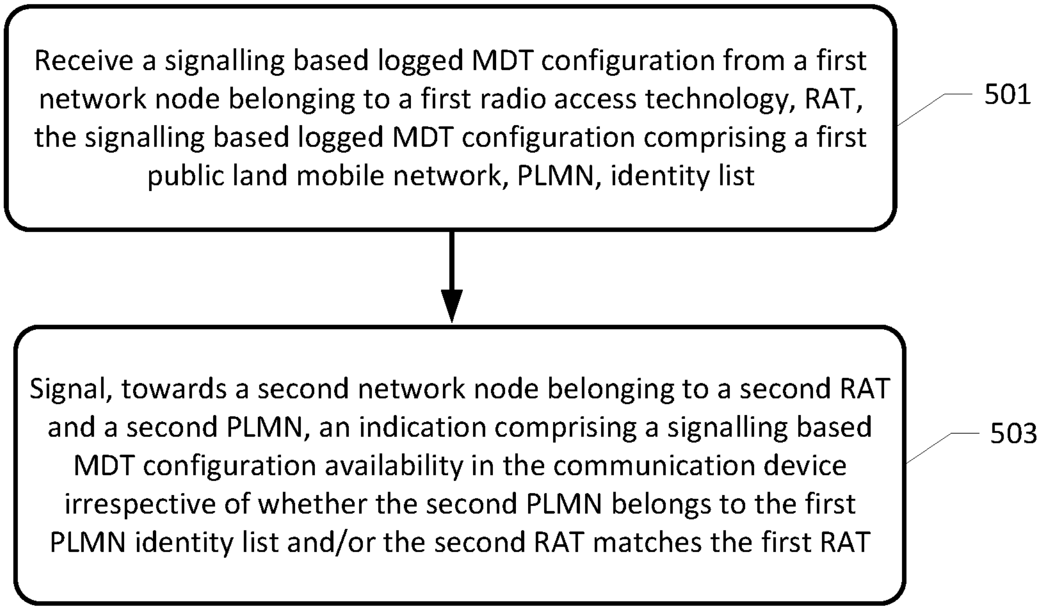
FIGS. 5-6 are flow charts illustrating operations of a communication device according to some embodiments of inventive concepts.

Referring to FIG. 5, in various embodiments, a method performed by a communication device (200) for communicating with a wireless network is provided. The method includes receiving (501) a signalling based logged MDT configuration from a first network node belonging to a first RAT. The signalling based logged MDT configuration comprises a first PLMN identity list. The method further includes signalling (503), towards a second network node belonging to a second RAT and a second PLMN, an indication comprising a signalling based MDT configuration availability in the communication device irrespective of whether the second PLMN belongs to the first PLMN identity list and/or the second RAT matches the first RAT.

Figure 6:
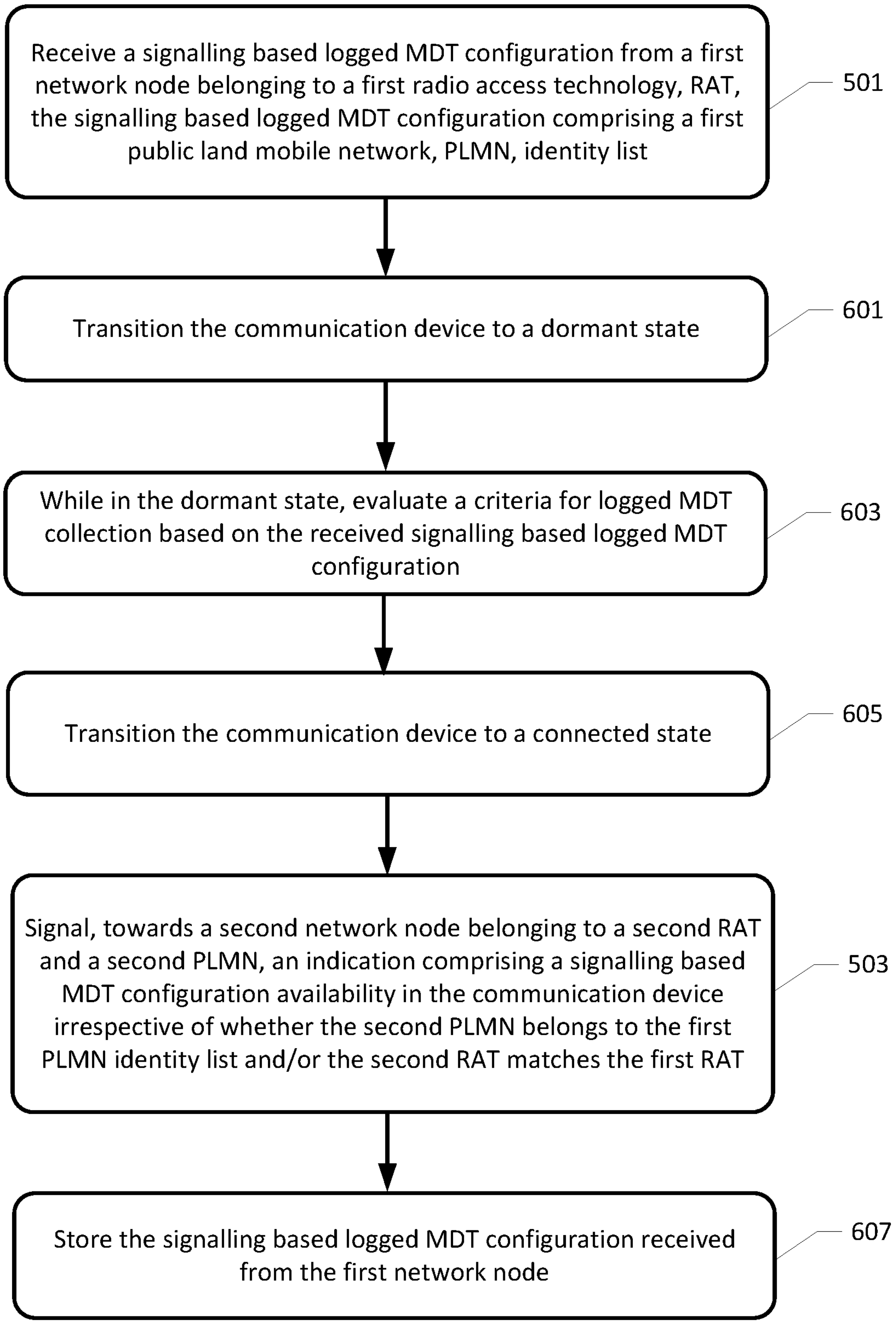

Referring to FIG. 6, in some embodiments, the method further includes storing (607) the signalling based logged MDT configuration received from the first network node.

In some embodiments, the indication is signalled when the second PLMN belongs to the first PLMN identity list, and irrespective of whether the first RAT and the second RAT are the same.

In some embodiments, the indication is signalled when the first RAT and the second RAT are the same, and irrespective of whether the second PLMN belongs to the first PLMN identity list.

In some embodiments, the signalling (503) the indication is performed with the communication device ignoring whether the first RAT and the second RAT are the same, and the second PLMN belongs to the first PLMN identity list, respectively.

In some embodiments, the indication is an indication of the first PLMN and the first RAT.

In some embodiments, the signalling (503) is performed for a defined period of time after expiration of a timer included in the signalling based logged MDT received from the network node.

Referring to FIG. 6, in some embodiments, the method further includes transitioning (601) the communication device to a dormant state; and transitioning (605) the communication device to a connected state.

In some embodiments, while in the dormant state, the method further includes evaluating (603) a criteria for logged MDT collection based on the received signalling based logged MDT configuration.

Various operations from the flow chart of FIG. 6 may be optional with respect to some embodiments of communication devices and related methods. Regarding methods of example embodiments, for example, operations of blocks 601-607 of FIG. 6 may be optional.

In the description that follows, while the network node may be any of the RAN node 300, network node QQ110A, QQ110B, QQ300, QQ606, hardware QQ504, or virtual machine QQ508A, QQ508B, the RAN node 700 shall be used to describe the functionality of the operations of the network node. Operations of the RAN node 300 (implemented using the structure of FIG. 3) will now be discussed with reference to the flow charts of FIGS. 7 and 8 according to some embodiments of inventive concepts. For example, modules may be stored in memory 305 of FIG. 3, and these modules may provide instructions so that when the instructions of a module are executed by respective RAN node processing circuitry 303, processing circuitry 303 performs respective operations of the flow charts.

Figure 7:
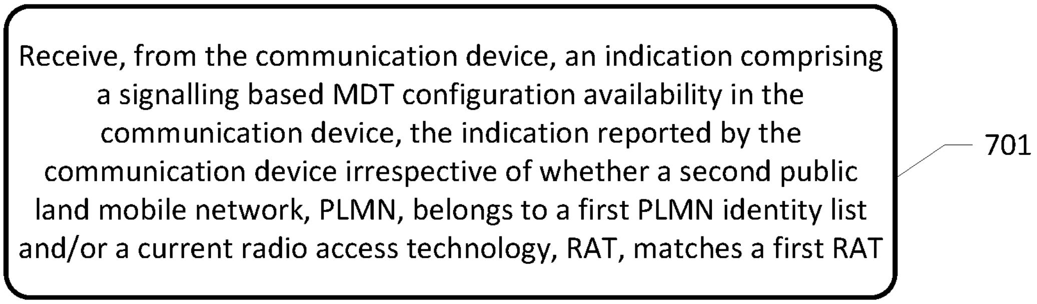
FIGS. 7-8 are flow charts illustrating operations of a network node according to some embodiments of inventive concepts.

Referring to FIG. 7, a method performed by a network node (300) communicatively connected to a communication device (200) for communicating with a wireless network is provided. The method includes receiving (701), from the communication device, an indication comprising a signalling based MDT configuration availability in the communication device, the indication reported by the communication device irrespective of whether a second PLMN belongs to a first PLMN identity list and/or a current RAT matches a first RAT.

In some embodiments, the indication is reported by the communication device when the second PLMN belongs to the first PLMN identity list, and irrespective of whether the first RAT and a second RAT are the same.

In some embodiments, the indication is reported by the communication device when the first RAT and a second RAT are the same, and irrespective of whether the second PLMN belongs to the first PLMN identity list.

In some embodiments, the indication is reported by the communication device with the communication device ignoring whether the first RAT and a second RAT are the same, and the second PLMN belongs to the first PLMN identity list, respectively.

In some embodiments, the indication is an indication of the first PLMN and the first RAT.

In some embodiments, the indication is reported by the communication device for a defined period of time after expiration of a timer included in a signalling based logged MDT of the communication device received from a network node of a configuring PLMN and/or a configuring RAT.

Figure 8:
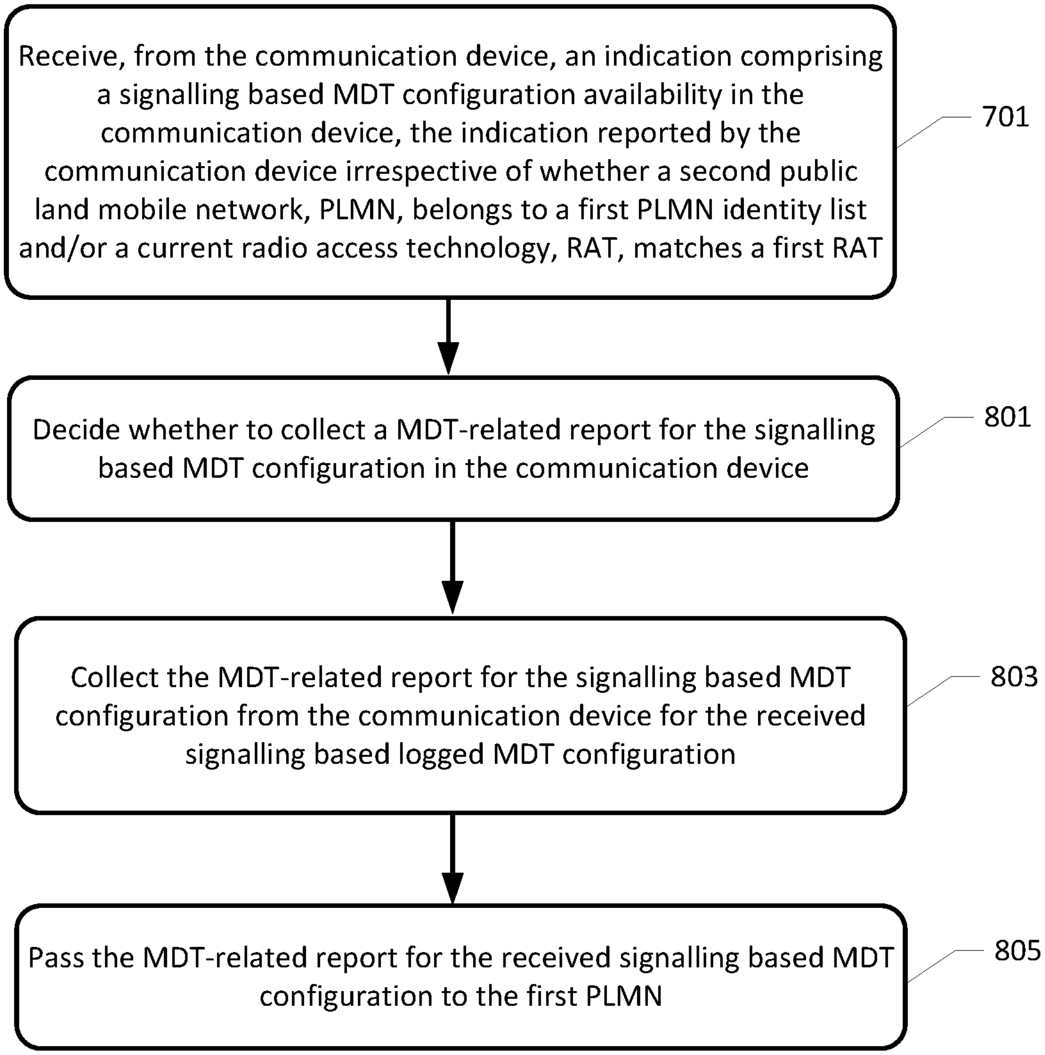

Referring to FIG. 8, in some embodiments, the method further includes, responsive to receiving the indication, deciding (801) whether to collect a MDT-related report for the signalling based MDT configuration in the communication device.

In some embodiments, the method further includes collecting (803) the MDT-related report for the signalling based MDT configuration from the communication device for the received signalling based logged MDT configuration; and passing (805) the MDT-related report for the received signalling based MDT configuration to the first PLMN.

Various operations from the flow chart of FIG. 8 may be optional with respect to some embodiments of RAN nodes and related methods. Regarding methods of example embodiments (set forth below), for example, operations of blocks 801, 803, and 805 of FIG. 8 may be optional.

Figure 9:
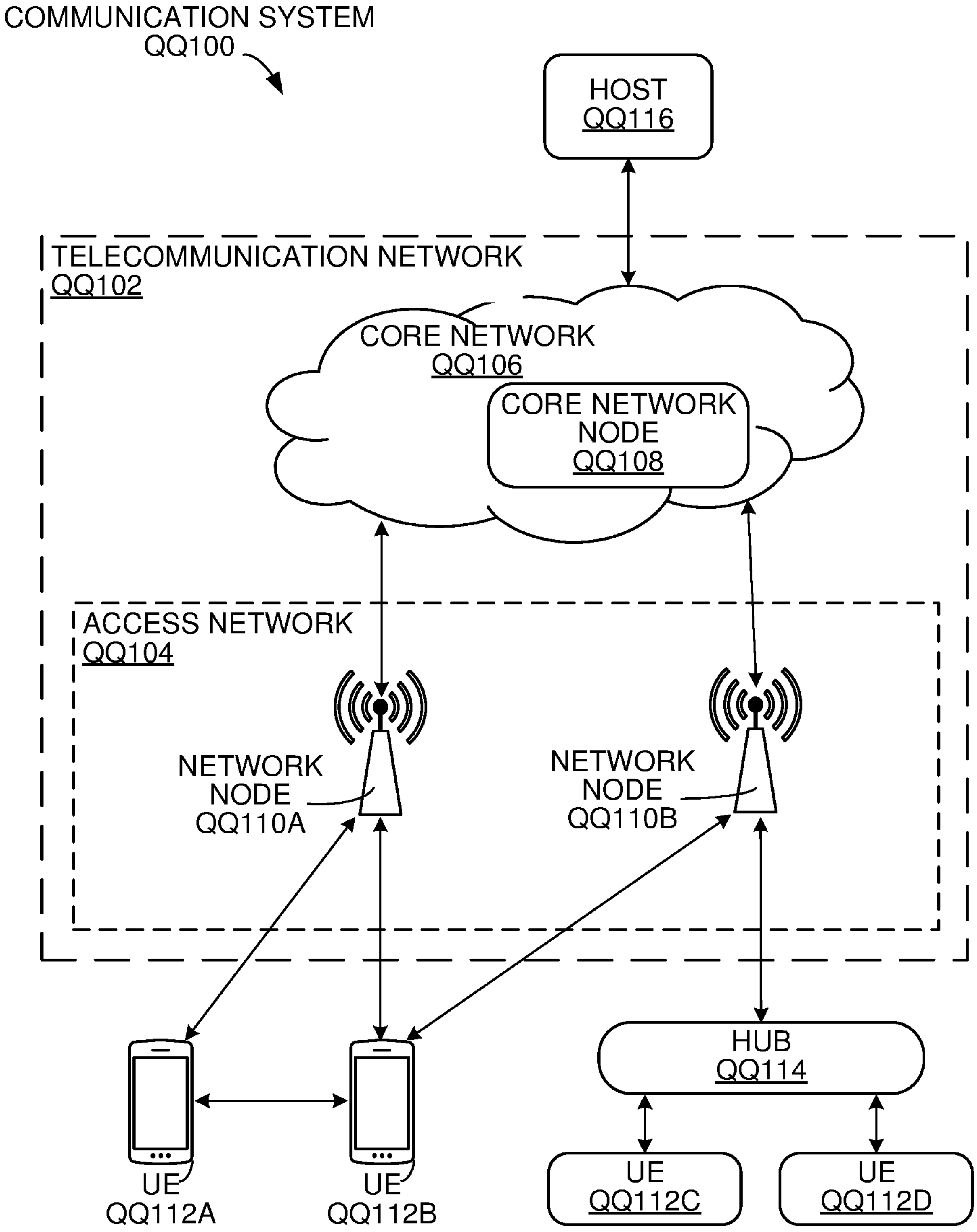
FIG. 9 is a block diagram of a communication system in accordance with some embodiments.

FIG. 9 shows an example of a communication system QQ100 in accordance with some embodiments.

In the example, the communication system QQ100 includes a telecommunication network QQ102 that includes an access network QQ104, such as a RAN, and a core network QQ106, which includes one or more core network nodes QQ108. The access network QQ104 includes one or more access network nodes, such as network nodes QQ110*a* and QQ110*b* (one or more of which may be generally referred to as network nodes QQ110), or any other similar 3GPP access node or non-3GPP access point. The network nodes QQ110 facilitate direct or indirect connection of a UE, such as by connecting UEs QQ112*a*, QQ112*b*, QQ112*c*, and QQ112*d* (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102, and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. 9 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112*c* and/or QQ112*d*) and network nodes (e.g., network node QQ110*b*). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110*b*. The hub QQ114 may also allow for a different communication scheme and/or schedule between the hub QQ114 and UEs (e.g., UE QQ112*c* and/or QQ112*d*), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110*b*. In other embodiments, the hub QQ114 may be a non-dedicated hub—that is, a device which is capable of operating to route communications between the UEs and network node QQ110*b*, but which is additionally capable of operating as a communication start and/or end point for certain data channels.

Figure 10:
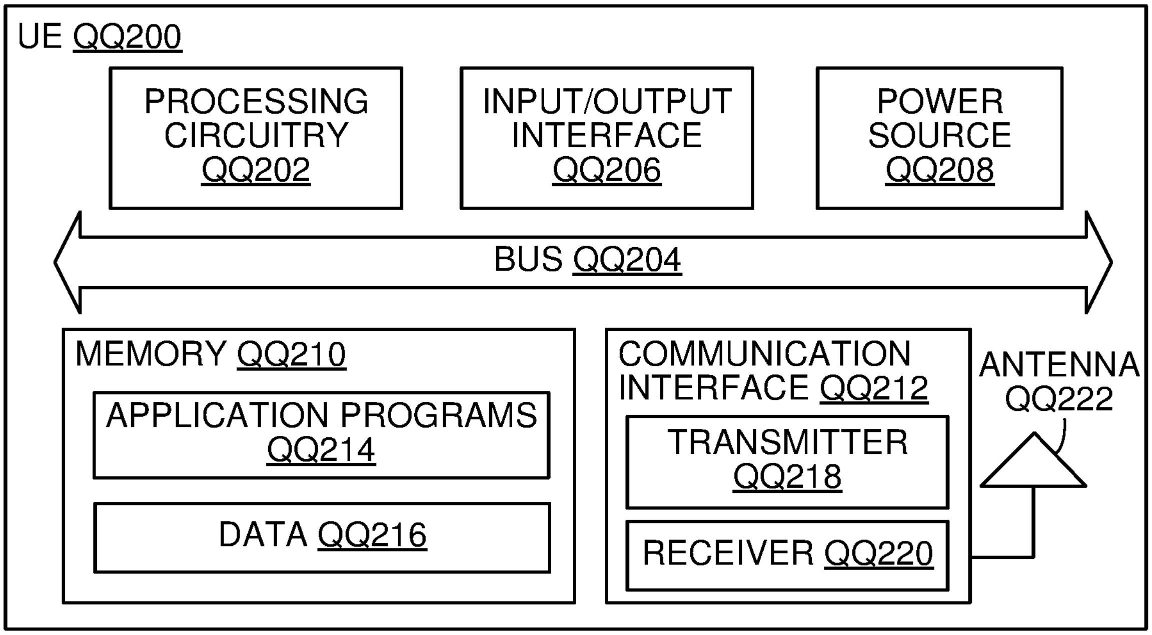
FIG. 10 is a block diagram of a user equipment in accordance with some embodiments

FIG. 10 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3GPP, including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 10.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 11:
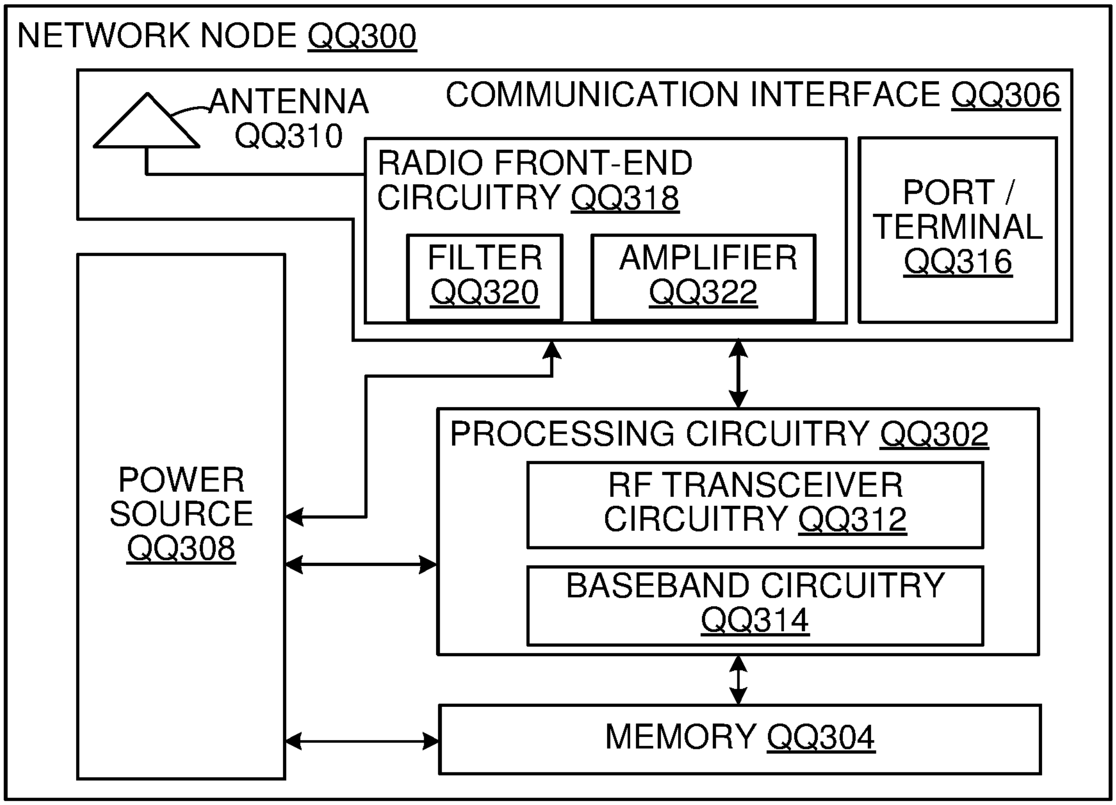
FIG. 11 is a block diagram of a network node in accordance with some embodiments.

FIG. 11 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or MDTs.

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple RATs. In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal(s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 11 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 12:
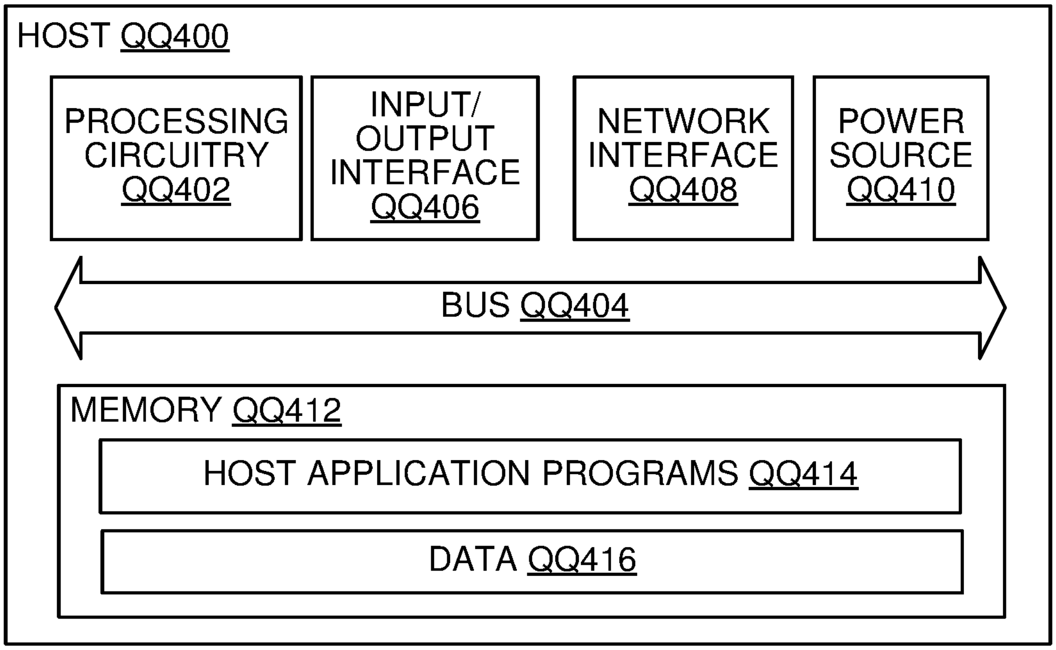
FIG. 12 is a block diagram of a host computer communicating with a user equipment in accordance with some embodiments.

FIG. 12 is a block diagram of a host QQ400, which may be an embodiment of the host QQ116 of FIG. 9, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 10 and 11, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400 or data generated by the host QQ400 for a UE. Embodiments of the host QQ400 may utilize only a subset or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 13:
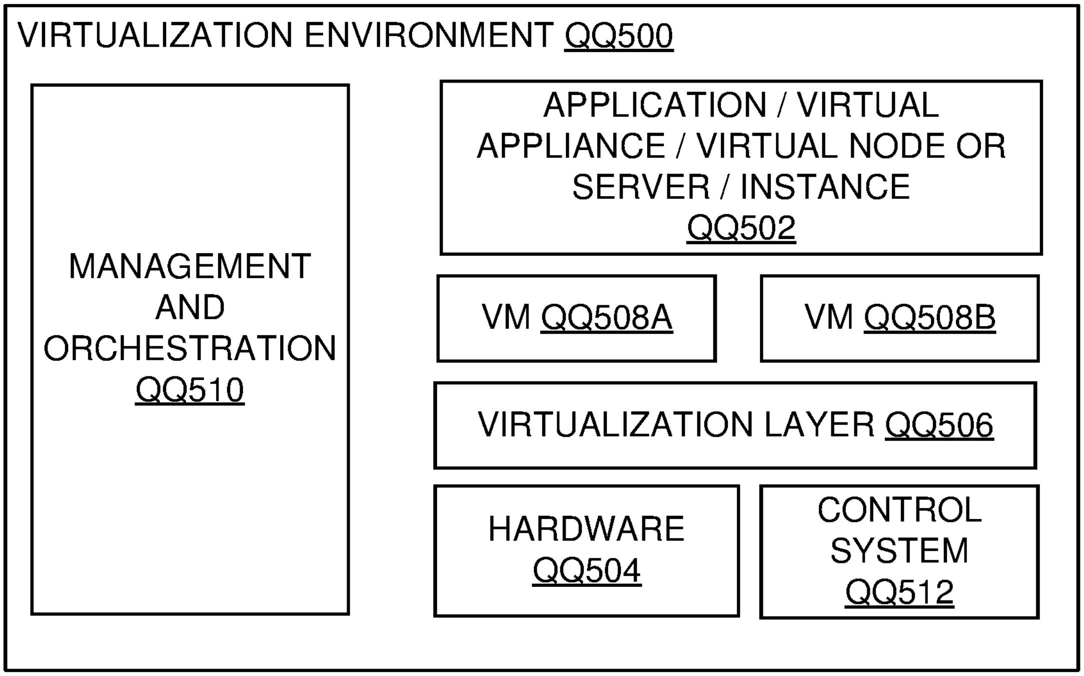
FIG. 13 is a block diagram of a virtualization environment in accordance with some embodiments.

FIG. 13 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508*a* and QQ508*b* (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g. such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 14:
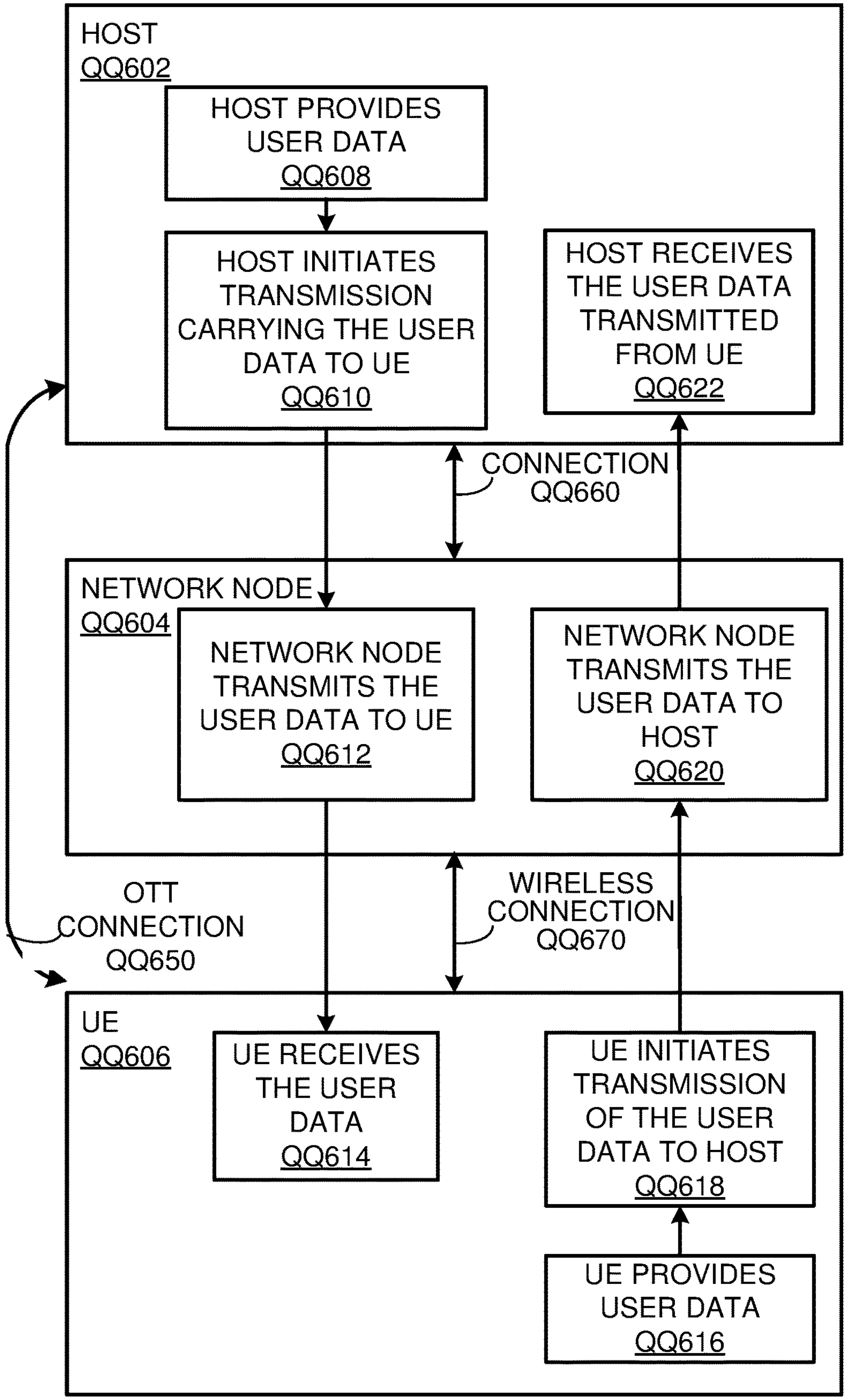
FIG. 14 is a block diagram of a host computer communicating via a base station with a user equipment over a partially wireless connection in accordance with some embodiments in accordance with some embodiments.

FIG. 14 shows a communication diagram of a host QQ602 communicating via a network node QQ604 with a UE QQ606 over a partially wireless connection in accordance with some embodiments. Example implementations, in accordance with various embodiments, of the UE (such as a UE QQ112*a* of FIG. 9 and/or UE QQ200 of FIG. 10), network node (such as network node QQ110*a* of FIG. 9 and/or network node QQ300 of FIG. 11), and host (such as host QQ116 of FIG. 9 and/or host QQ400 of FIG. 12) discussed in the preceding paragraphs will now be described with reference to FIG. 14.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 9) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve the communications with a wireless network and thereby provide benefits such as avoidance of overwriting a preconfigured signalling based MDT configuration in a communication device.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above, or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a communication device for communicating with a wireless network, the method comprising:

receiving a signaling based logged minimization of drive test, MDT, configuration from a first network node belonging to a first radio access technology, RAT, the signaling based logged MDT configuration comprising a first public land mobile network, PLMN, identity list; and signaling, towards a second network node belonging to a second RAT and a second PLMN, an indication indicating a signaling based MDT configuration availability in the communication device, wherein the signaling is performed when the second RAT does not match the first RAT.

2. The method of claim 1, further comprising:

storing the signaling based logged MDT configuration received from the first network node.

3. The method of claim 1, wherein the indication is signaled when the second PLMN belongs to the first PLMN identity list, and irrespective of whether the first RAT and the second RAT are the same.

4. The method of claim 1, wherein the signaling the indication is performed with the communication device ignoring whether the first RAT and the second RAT are the same, and the second PLMN belongs to the first PLMN identity list, respectively.

5. The method of claim 4, wherein the indication is an indication of a first PLMN and the first RAT.

6. The method of claim 1, wherein the signaling is performed for a defined period of time after expiration of a timer included in the signaling based logged MDT received from the first network node.

7. The method of claim 1, further comprising:

transitioning the communication device to a dormant state; and transitioning the communication device to a connected state.

8. The method of claim 7, further comprising:

while in the dormant state, evaluating a criteria for logged MDT collection based on the received signaling based logged MDT configuration.

9. A communication device for communicating with a wireless network, the communication device comprising:

at least one processor;

at least one memory connected to the at least one processor and storing program code that is executed by the at least one processor to perform operations comprising to:

receive a signaling based logged minimization of drive test, MDT, configuration from a first network node belonging to a first radio access technology, RAT, the signaling based logged MDT configuration comprising a first public land mobile network, PLMN, identity list; and signal, towards a second network node belonging to a second RAT and a second PLMN, an indication indicating a signaling based MDT configuration availability in the communication device, wherein the signaling is performed when the second RAT does not match the first RAT.

10. The communication device of claim 9, wherein the indication is signaled when the second PLMN belongs to the first PLMN identity list, and irrespective of whether the first RAT and the second RAT are the same.

11. A computer program product comprising a non-transitory storage medium including program code to be executed by processing circuitry of a communication device for communicating with a wireless network, whereby execution of the program code causes the communication device to perform operations comprising:

receive a signaling based logged minimization of drive test, MDT, configuration from a first network node belonging to a first radio access technology, RAT, the signaling based logged MDT configuration comprising a first public land mobile network, PLMN, identity list; and signal, towards a second network node belonging to a second RAT and a second PLMN, an indication indicating a signaling based MDT configuration availability in the communication device, wherein the signaling is performed when the second RAT does not match the first RAT.

12. The computer program product of claim 11, wherein the indication is signaled when the second PLMN belongs to the first PLMN identity list, and irrespective of whether the first RAT and the second RAT are the same.

13. The communication device of claim 9, wherein the at least one memory connected to the at least one processor and storing program code that is executed by the at least one processor to further perform operations comprising to:

store the signaling based logged MDT configuration received from the first network node.

14. The communication device of claim 9, wherein the signaling the indication is performed with the communication device ignoring whether the first RAT and the second RAT are the same, and the second PLMN belongs to the first PLMN identity list, respectively.

15. The communication device of claim 14, wherein the indication is an indication of a first PLMN and the first RAT.

16. The communication device of claim 9, wherein the signaling is performed for a defined period of time after expiration of a timer included in the signaling based logged MDT received from the first network node.

17. The communication device of claim 9, wherein the at least one memory connected to the at least one processor and storing program code that is executed by the at least one processor to further perform operations comprising to:

transition the communication device to a dormant state; and transition the communication device to a connected state.

18. The communication device of claim 17, wherein the at least one memory connected to the at least one processor and storing program code that is executed by the at least one processor to further perform operations comprising to:

while in the dormant state, evaluate a criteria for logged MDT collection based on the received signaling based logged MDT configuration.

* * * * *